United States Patent
Kato

(10) Patent No.: US 10,767,549 B2
(45) Date of Patent: Sep. 8, 2020

(54) INTERNAL COMBUSTION ENGINE

(71) Applicant: TOYOTA JIDOSHA KABUSHIKI KAISHA, Toyota-shi, Aichi-ken (JP)

(72) Inventor: Akira Kato, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 30 days.

(21) Appl. No.: 16/238,794

(22) Filed: Jan. 3, 2019

(65) Prior Publication Data
US 2019/0271261 A1    Sep. 5, 2019

(30) Foreign Application Priority Data
Mar. 2, 2018  (JP) .................. 2018-037388

(51) Int. Cl.
| | |
|---|---|
| *F02B 19/10* | (2006.01) |
| *F02D 41/30* | (2006.01) |
| *F02B 19/00* | (2006.01) |
| *F02D 41/06* | (2006.01) |
| *F02D 35/02* | (2006.01) |
| *F02B 19/12* | (2006.01) |

(52) U.S. Cl.
CPC .......... *F02B 19/1085* (2013.01); *F02B 19/00* (2013.01); *F02B 19/10* (2013.01); *F02D 35/025* (2013.01); *F02D 41/068* (2013.01); *F02D 41/3094* (2013.01); *F02B 19/12* (2013.01); *F02D 2200/022* (2013.01); *F02D 2200/04* (2013.01)

(58) Field of Classification Search
CPC ...... F02B 19/10; F02B 19/1085; F02B 19/00; F02D 35/02; F02D 35/025; F02D 41/06; F02D 41/068; F02D 41/30; F02D 41/3094

USPC .................................................. 123/250–273
See application file for complete search history.

(56) References Cited

U.S. PATENT DOCUMENTS

| | | | | |
|---|---|---|---|---|
| 5,522,357 | A * | 6/1996 | Nogi | F02B 1/10 |
| | | | | 123/261 |
| 6,073,605 | A * | 6/2000 | Matsuoka | F02B 19/02 |
| | | | | 123/292 |
| 9,353,674 | B2 * | 5/2016 | Bunce | F02B 19/1057 |
| 10,202,891 | B2 * | 2/2019 | Oda | F02B 19/12 |
| 10,378,428 | B2 * | 8/2019 | Muto | F02B 19/12 |
| 2012/0016571 | A1 * | 1/2012 | Nada | F02D 41/3035 |
| | | | | 701/104 |

FOREIGN PATENT DOCUMENTS

JP    2004-36424 A    2/2004

* cited by examiner

*Primary Examiner* — John Kwon
*Assistant Examiner* — Johnny H Hoang
(74) *Attorney, Agent, or Firm* — Oliff PLC

(57) ABSTRACT

An auxiliary chamber having an auxiliary fuel injector is formed on the top surface of a main combustion chamber. When making the air-fuel mixture inside the auxiliary chamber burn, the air-fuel mixture inside the main combustion chamber is burned by jet flames ejected from a communicating hole. After engine startup and until the elapse of a wall surface lower temperature period where the wall surface temperature of the auxiliary chamber becomes a lower temperature than the wall surface temperature of the auxiliary chamber at the time of completion of warmup, an injection ratio of an injection amount of liquid fuel from the auxiliary fuel injector to a fuel injection amount from a main fuel injector is made to decrease compared with after completion of warmup.

5 Claims, 8 Drawing Sheets

INTERNAL COMBUSTION ENGINE

FIELD

The present invention relates to an internal combustion engine.

BACKGROUND

Known in the art is an internal combustion engine designed so that main fuel gas is supplied to an inside of a main combustion chamber, an auxiliary chamber communicating through communicating holes with the inside of the main combustion chamber and having a spark plug is formed on a top surface of the main combustion chamber, auxiliary fuel gas is supplied to the inside of the auxiliary chamber, and, the main fuel gas inside the main combustion chamber is burned by jet flames ejected from the communicating hole when the auxiliary fuel gas supplied to the inside of the auxiliary chamber is made to burn (for example, see Japanese Unexamined Patent Publication No. 2004-36424).

SUMMARY

In this regard, in such an internal combustion engine, when trying to inject liquid fuel into the auxiliary chamber, when the temperature of the auxiliary chamber is low and, therefore, the wall surface temperature of the auxiliary chamber is low, the liquid fuel injected into the auxiliary chamber cannot sufficiently evaporate, so the liquid fuel injected into the auxiliary chamber will deposit on the inside wall surface of the auxiliary chamber. If in this way liquid fuel deposits on the inside wall surface of the auxiliary chamber, the deposited fuel will be heated in the state of insufficient oxygen and carbonize. As a result, the problem will arise of a large amount of particulate matter (PM) being produced.

However, in the above-mentioned Japanese Unexamined Patent Publication, what is supplied to the inside of the auxiliary chamber is the auxiliary fuel gas, that is, gaseous fuel, so the problem of deposition of fuel on the inside wall surface of the auxiliary chamber never arises. Therefore, the above-mentioned Japanese Unexamined Patent Publication does not consider at all the deposition of fuel on the inside wall surface of the auxiliary chamber.

To solve this problem, according to the present invention, there is provided an internal combustion engine comprising:
a main combustion chamber,
a main fuel injector for feeding fuel to the main combustion chamber,
an auxiliary chamber formed on a top surface of the main combustion chamber and communicating through communicating holes with an inside of the main combustion chamber,
an auxiliary fuel injector arranged in the auxiliary chamber, and
an electronic control unit, an air-fuel mixture in the main combustion chamber being burned by jet flames ejected from the communicating holes when liquid fuel injected into the auxiliary chamber is made to burn,
the electronic control unit being configured to control an injection ratio of an injection amount of liquid fuel from the auxiliary fuel injector to an injection amount of fuel from the main fuel injector in accordance with a wall surface lower temperature period where a wall surface temperature of the auxiliary chamber is a lower temperature than a wall surface temperature of the auxiliary chamber at the time of completion of warmup,
the electronic control unit being configured to decrease the injection ratio as compared with after completion of warmup during a time from when the engine is started and to when the wall surface lower temperature period has elapsed.

Advantageous Effects of Invention

By decreasing the injection ratio of the injection amount of liquid fuel from the auxiliary fuel injector to the fuel injection amount from the main fuel injector as compared with after completion of warmup when the wall surface temperature of the auxiliary chamber is lower than the wall surface temperature of the auxiliary chamber at the time of completion of warmup, deposition of fuel to the inside wall surface of the auxiliary chamber is suppressed and thereby a large amount of particulate matter (PM) is prevented from being discharged.

DESCRIPTION OF EMBODIMENTS

Figure 1:
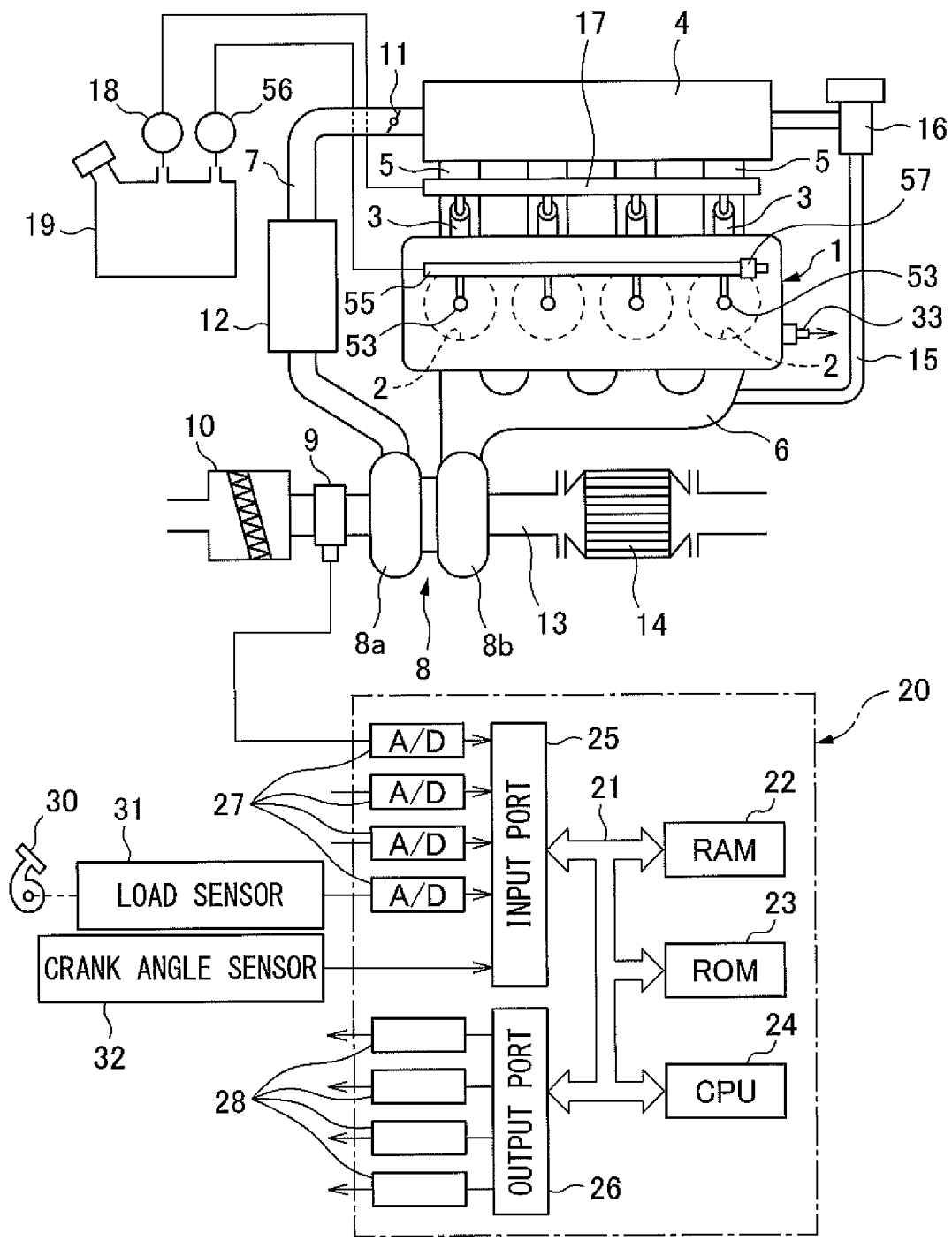
FIG. 1 is an overall view of an internal combustion engine.

FIG. 1 shows an overview of an internal combustion engine fueled by gasoline. Referring to FIG. 1, 1 indicates an engine body, 2 a main combustion chamber of each cylinder, 3 a main fuel injector respectively provided for each cylinder, 4 a surge tank, 5 intake branch pipes, and 6 an exhaust manifold. The surge tank 4 is connected through an intake duct 7 to the outlet of a compressor 8a of an exhaust turbocharger 8. The inlet of the compressor 8a is connected through an intake air amount detector 9 to an air cleaner 10. Inside the intake duct 7, a throttle valve 11 driven by an actuator is arranged. Around the intake duct 7, an intercooler 12 for cooling the intake air flowing through the inside of the intake duct 7 is arranged.

On the other hand, the exhaust manifold 6 is connected to the inlet of an exhaust turbine 8b of the exhaust turbocharger 8, while the outlet of the exhaust turbine 8b is connected through an exhaust pipe 13 to an exhaust purification use catalytic converter 14. The exhaust manifold 6 and the surge tank 4 are connected with each other through an exhaust gas recirculation (below, referred to as "EGR") passage 15. Inside of the EGR passage 15, an EGR control valve 16 is arranged. Each main fuel injector 3 is connected to a fuel distributor 17. This fuel distributor 17 is connected through a fuel pump 18 to a fuel tank 19.

An electronic control unit 20 is comprised of a digital computer provided with a ROM (read only memory) 22, RAM (random access memory) 23, CPU (microprocessor) 24, input port 25, and output port 26 which are connected with each other by bidirectional bus 21. A water temperature sensor 33 for detecting the cooling water temperature of the engine is attached to the engine body 1, and the output signal of this water temperature sensor 33 and the output signal of the intake air amount detector 9 are input through corresponding AD converters 27 to the input port 25, respectively. Further, an accelerator pedal 30 is connected to a load sensor 31 generating an output voltage proportional to the amount of depression of the accelerator pedal 30. The output voltage of the load sensor 31 is input through a corresponding AD converter 27 to the input port 25. Furthermore, the input port 25 is connected to a crank angle sensor 32 generating an output pulse each time a crankshaft rotates by for example 30°. In the CPU 24, the rotation speed of the engine is calculated from the output pulse of the crank angle sensor 32. On the other hand, the output port 26 is connected through corresponding drive circuits 28 to the main fuel injectors 3, the actuator for driving the throttle valve 11, the EGR control valve 16, and the fuel pump 18.

Figure 2:
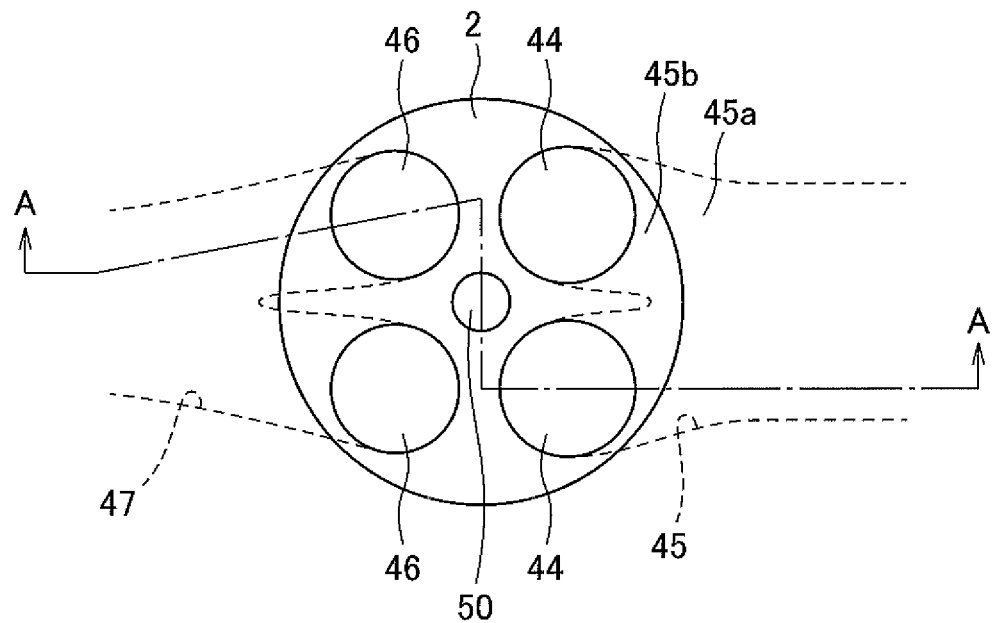
FIG. 2 is a view of a cylinder head seen from below.
Figure 3:
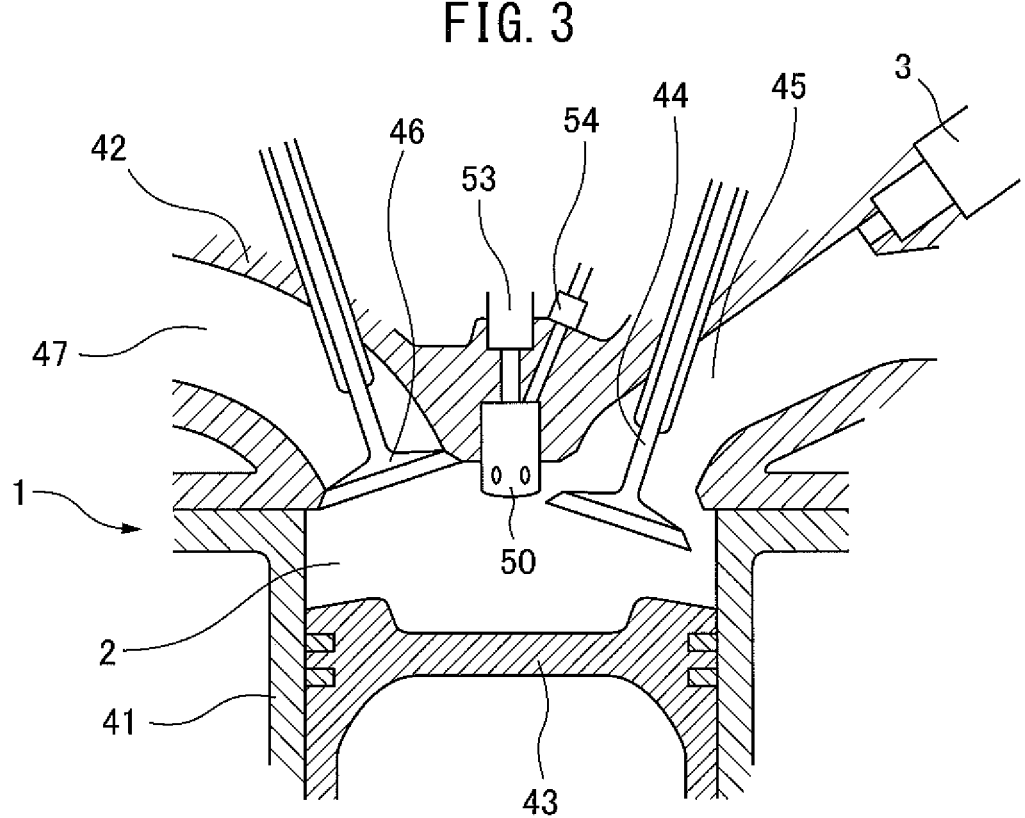
FIG. 3 is a side cross-sectional view of an internal combustion engine seen along an A-A cross-section of FIG. 2.
Figure 4:
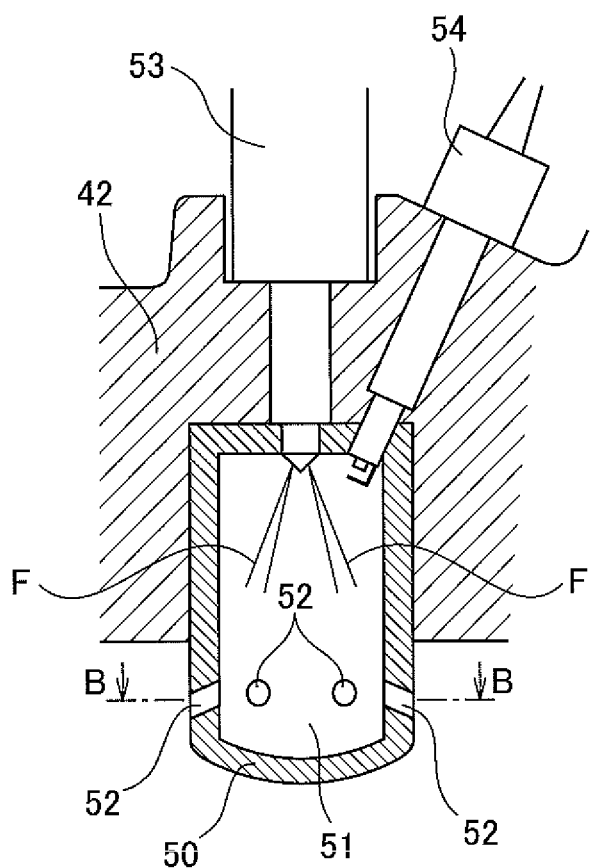
FIG. 4 is an enlarged side cross-sectional view of the surroundings of an auxiliary chamber.

FIG. 3 is a cross-sectional view of the engine body 1 shown in FIG. 1, while FIG. 2 is a bottom view of the top surface of the combustion chamber 2 shown in FIG. 3. Note that, in FIG. 2 and FIG. 3, 41 indicates a cylinder block, 42 a cylinder head attached to the top of the cylinder block 41, 43 a piston reciprocally moving in the cylinder block 41, 44 a pair of intake valves, 45 an intake port, 46 a pair of exhaust valves, and 47 an exhaust port. As shown in FIG. 2 and FIG. 3, the intake port 45 extends in the cylinder head 42 so as to separate from the center axis of the cylinder as it separates from the main combustion chamber 2. In the example shown in FIG. 2 and FIG. 3, the intake port 45 is formed from a common passage part 45a for the pair of the intake valves 44 and branched passage parts 45b branching from this common passage part 45a toward the intake valves 44. The main fuel injector 3 is arranged in the common passage part 45a of the intake port 45. Note that, in this case, the main fuel injector 3 can be arranged in the main combustion chamber 2. In addition, it is possible to use two main fuel injectors 3 so as to arrange one of the main fuel injector 3 in the intake port 45 and the other main fuel injector 3 in the main combustion chamber 2.

On the other hand, referring to FIG. 2 to FIG. 5, at a central part of the top surface of the main combustion chamber 2, an auxiliary chamber casing 50 is attached. In the example shown in FIG. 2 to FIG. 5, this auxiliary chamber casing 50 has a thin wall hollow cylindrical shape with two closed ends and is attached to the top surface of the main combustion chamber 2 so that the central axis of the auxiliary chamber casing 50 extends in the central axial direction of the cylinder. Further, in the example shown in FIG. 2 to FIG. 5, the upper portion of the auxiliary chamber casing 50 is positioned in the cylinder head 42, while only the lower portion of the auxiliary chamber casing 50 is exposed to the inside of the main combustion chamber 2. Inside this auxiliary chamber casing 50, an auxiliary chamber 51 is formed. The auxiliary chamber casing 50 is formed with a plurality of communicating holes 52 radially extending from the peripheral part of the end portion of the auxiliary chamber 51, which end portion is located on the main combustion chamber 2 side, toward the peripheral part of the main combustion chamber 2.

Figure 5:
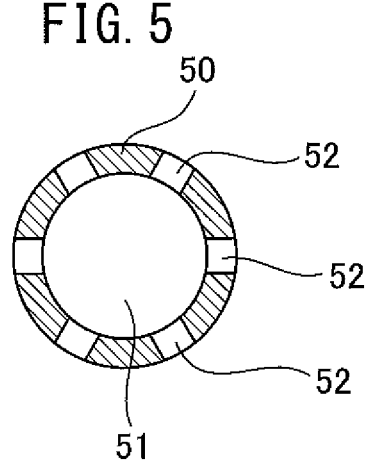
FIG. 5 is a cross-sectional view of an auxiliary chamber casing seen along a B-B cross-section of FIG. 4.

In this case, in the embodiment of the present invention, as shown in FIG. 5, the communicating holes 52 are formed at equal angular intervals about the center axis of the auxiliary chamber casing 50 so as to radially extend from the center axis of the auxiliary chamber casing 50. Further, in the embodiment of the present invention, at the central part of the top surface of the auxiliary chamber 51, an auxiliary fuel injector 53 is arranged. Furthermore, at the peripheral part of the top surface of the auxiliary chamber 51, a spark plug 54 is arranged. The auxiliary fuel injector 53 of each cylinder, as shown in FIG. 1, is connected to a fuel distributor 55. This fuel distributor 55 is connected through a fuel pump 56 to the fuel tank 19. At this fuel distributor 55, a fuel pressure sensor 57 is attached for detecting a fuel pressure in the fuel distributor 55. An output signal of this fuel pressure sensor 57 is input through the corresponding AD converter 27 to the input port 25. Further, the auxiliary fuel injector 53 and the spark plug 54 of each cylinder are connected through the corresponding drive circuits 28 to the output port 26.

Figure 6:
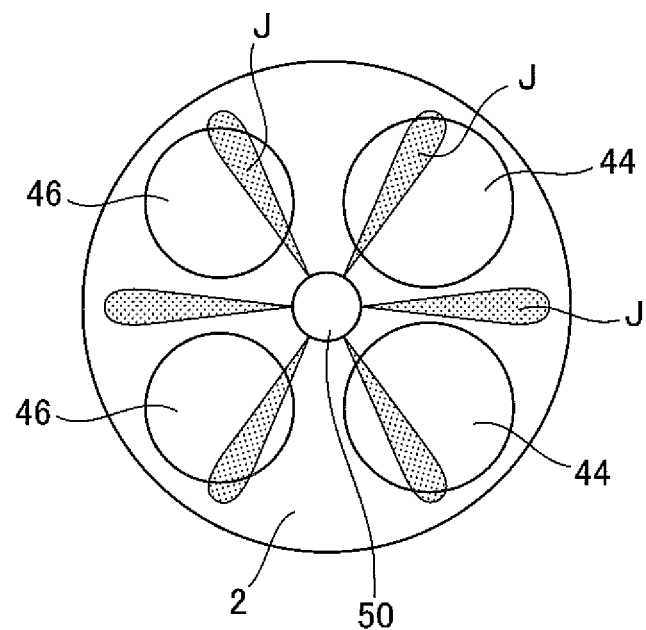
FIG. 6 is a view showing jet flames ejected from an auxiliary chamber.

In the internal combustion engine shown from FIG. 1 to FIG. 5, if the intake valve 44 is opened, the fuel injected from the main fuel injector 3 is supplied to the inside of the main combustion chamber 2 together with the intake air whereby an air-fuel mixture is formed in the main combustion chamber 2. Next, when the compression stroke is started, a part of the air-fuel mixture in the main combustion chamber 2 flows uniformly from all of the communicating holes 52 to the inside of the auxiliary chamber 51. Note that, as shown by F in FIG. 4, the liquid fuel is injected from the auxiliary fuel injector 53 at the intake stroke or at the first half or latter half of the compression stroke. Next, at the end phase of the compression stroke, an ignition action by the spark plug 54 is performed, and the air-fuel mixture in the auxiliary chamber 51 is burned. If the air-fuel mixture in the auxiliary chamber 51 is burned, as shown in FIG. 6, jet flames J are ejected from the communicating holes 52, and the air-fuel mixture in the main combustion chamber 2 is burned by these jet flames J.

Figure 7:
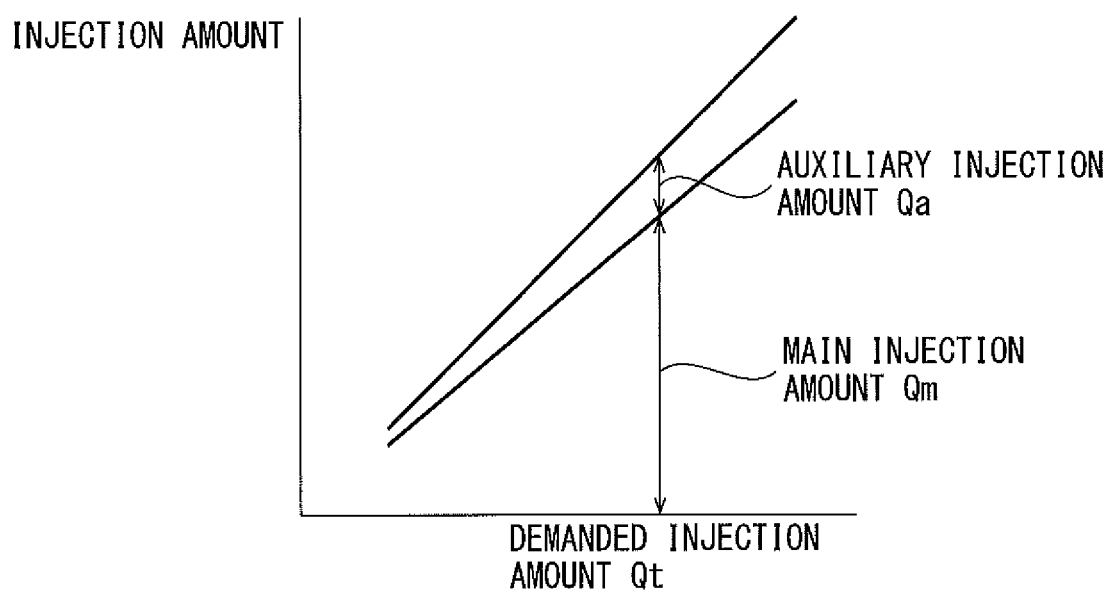
FIG. 7 is a view showing an auxiliary injection amount and a main injection amount.

FIG. 7 shows the relationships between the demanded injection amount Qt and the main injection amount Qm from the main fuel injector 3 and the auxiliary injection amount Qa from the auxiliary fuel injector 53. Note that, among these demanded injection amount Qt, main injection amount Qm, and auxiliary injection amount Qa, there is the relationship of demanded injection amount Qt=main injection amount Qm+auxiliary injection amount Qa. In this embodiment of the present invention, as will be understood from FIG. 7, the injection ratio (Qa/Qm) of the auxiliary injection amount Qa from the auxiliary fuel injector 53 to the main injection amount Qm from the main fuel injector 3 is usually made constant regardless of the demanded injection amount Qt. Note that, in the example shown in FIG. 7, the auxiliary injection amount Qa is made about 5 percent of the demanded injection amount Qt regardless of the demanded injection amount Qt.

Now then, in an embodiment of the present invention, liquid fuel is injected from the auxiliary fuel injector 53 to the inside of the auxiliary chamber 51. In this case, when the temperature of the auxiliary chamber 51 is low and, therefore, the wall surface temperature of the auxiliary chamber 51 is low, the liquid fuel injected to the inside of the auxiliary chamber 51 cannot sufficiently evaporate, so the liquid fuel injected to the inside of the auxiliary chamber 51 deposits on the inside wall surface of the auxiliary chamber 51. If in this way liquid fuel deposits on the inside wall surface of the auxiliary chamber 51, the deposited fuel will be heated in the state of insufficient oxygen and carbonize. As a result, the problem will arise of a large amount of particulate matter (PM) being produced and being discharged from the engine.

In this case, if making the amount of liquid fuel injected from the auxiliary fuel injector 53 decrease, the liquid fuel injected to the inside of the auxiliary chamber 51 can sufficiently evaporate and as a result the liquid fuel injected to the inside of the auxiliary chamber 51 is kept from depositing on the inside wall surface of the auxiliary chamber 51. Therefore, in the embodiment of the present invention, when the temperature of the auxiliary chamber 51 is low and, therefore, the wall surface temperature of the auxiliary chamber 51 is low, the amount of liquid fuel injected from the auxiliary fuel injector 53 is made to decrease. Note that, in the embodiment of the present invention, a reduction coefficient RC is introduced for the auxiliary injection amount Qa shown in FIG. 7 (actual auxiliary injection amount=auxiliary injection amount Qa·reduction coefficient RC) and this reduction coefficient RC is used to adjust the amount of liquid fuel injected from the auxiliary fuel injector 53. Next, this reduction coefficient RC will be explained with reference to FIG. 8A.

Figure 8A:
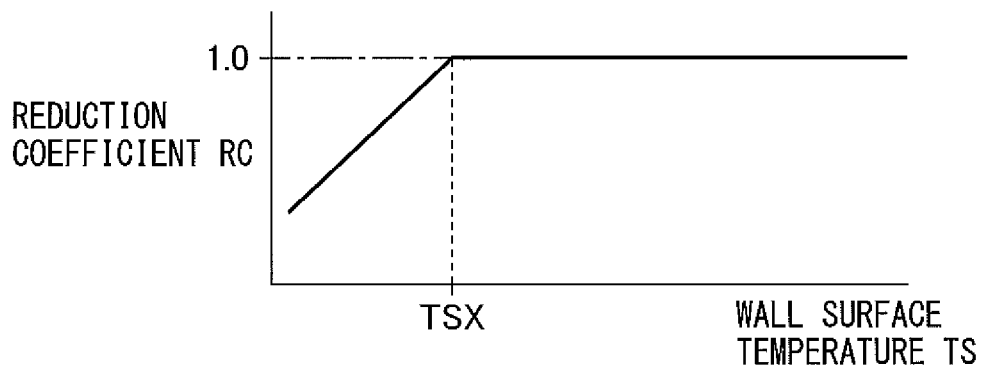
FIG. 8A and FIG. 8B are views showing relationships of a wall surface temperature TS of an auxiliary chamber and a reduction coefficient RC.

FIG. 8A shows the relationship between the wall surface temperature TS of the auxiliary chamber 51 and the reduction coefficient RC. TSX on the abscissa of FIG. 8A shows a fuel-deposited wall surface temperature at which liquid fuel injected to the inside of the auxiliary chamber 51 starts to deposit on the inside wall surface of the auxiliary chamber 51 when making the wall surface temperature TS of the auxiliary chamber 51 decrease. Therefore, when the wall surface temperature TS of the auxiliary chamber 51 is higher than the fuel-deposited wall surface temperature TSX, liquid fuel will not deposit on the inside wall surface of the auxiliary chamber 51. Therefore, at this time, there is no need to make the auxiliary injection amount Qa decrease, so the reduction coefficient RC is made 1.0. As opposed to this, if the wall surface temperature TS of the auxiliary chamber 51 becomes lower than the fuel-deposited wall surface temperature TSX, the liquid fuel deposits on the inside wall surface of the auxiliary chamber 51. Therefore, at this time, the auxiliary injection amount Qa has to be made to decrease. Therefore, at this time, the reduction coefficient RC is made smaller than 1.0. Note that, the lower the wall surface temperature TS of the auxiliary chamber 51 from the fuel-deposited wall surface temperature TSX, the easier it becomes for the liquid fuel to deposit on the inside wall surface of the auxiliary chamber 51, so the lower the wall surface temperature TS of the auxiliary chamber 51 from the fuel-deposited wall surface temperature TSX, the smaller the reduction coefficient RC is made.

In this way, in the embodiment of the present invention, the lower the wall surface temperature TS of the auxiliary chamber 51 from the fuel-deposited wall surface temperature TSX, the smaller the reduction coefficient RC is made. In this case, if the reduction coefficient RC becomes smaller, the actual auxiliary injection amount falls. At this time, in the embodiment of the present invention, to enable the total injection amount of the actual auxiliary injection amount and the actual main injection amount, that is, the entire injection amount, to become the demanded injection amount Qt, the lower the wall surface temperature TS of the auxiliary chamber 51 becomes from the fuel-deposited wall surface temperature TSX, the more the main injection amount Qm is made to increase, that is, in the embodiment of the present invention, the lower the wall surface temperature TS of the auxiliary chamber 51 becomes from the fuel-deposited wall surface temperature TSX, the more the injection ratio of the fuel injection amount from the auxiliary fuel injector 53 to the fuel injection amount from the main fuel injector 3 is made to decrease.

In this regard, the fuel-deposited wall surface temperature TSX changes depending on the shape or material of the wall surface of the auxiliary chamber 51. In the embodiment of the present invention, the fuel-deposited wall surface temperature TSX is 40° C. to 60° C. or so. The wall surface temperature TS of the auxiliary chamber 51 rises to 200° C. or more around when the warmup operation of the engine ends, and the wall surface temperature TS of the auxiliary chamber 51 becomes the fuel-deposited wall surface temperature TSX or less at the time of the engine warmup operation right after engine cold startup. That is, there is a possibility of liquid fuel depositing on the inside wall surface of the auxiliary chamber 51 at the time of the engine warmup operation right after engine cold startup. Therefore, in the embodiment of the present invention, at the time of the engine warmup operation right after engine cold startup, the injection ratio of the fuel injection amount from the auxiliary fuel injector 53 to the fuel injection amount from the main fuel injector 3 is made to decrease.

Figure 8B:
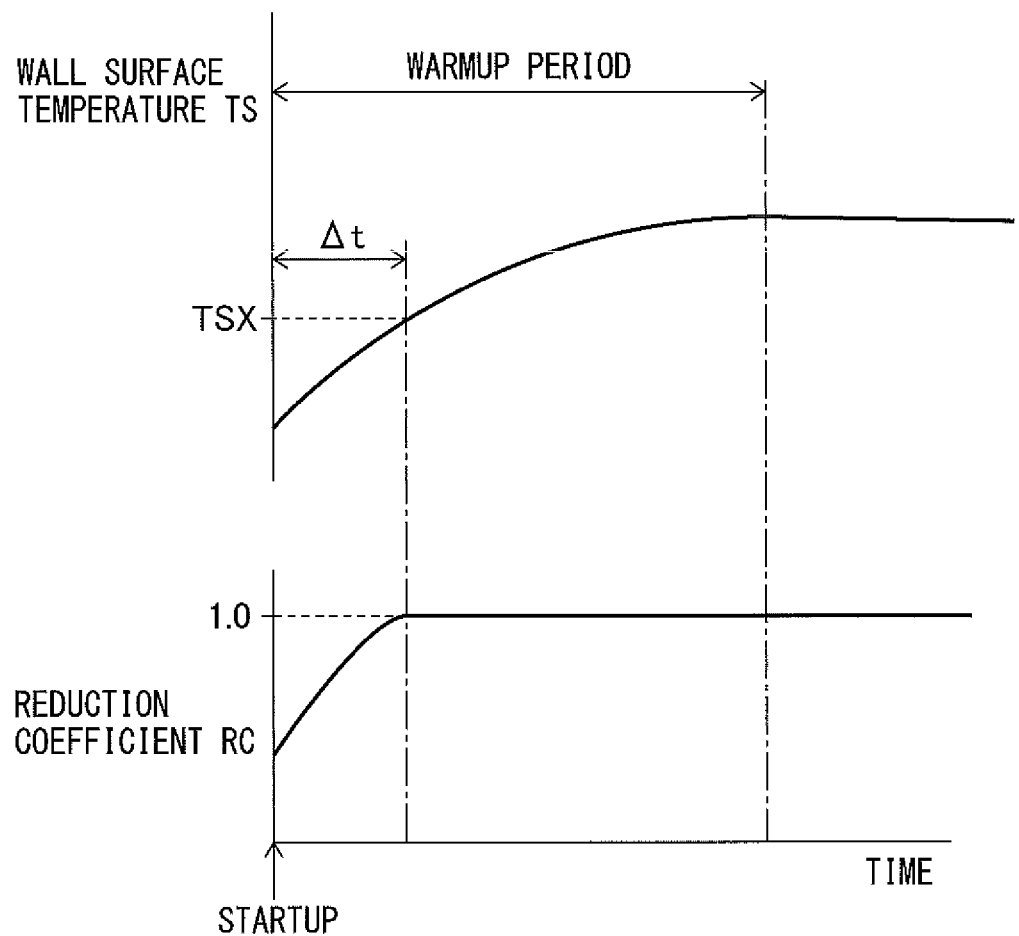

Next, referring to FIG. 8B, the embodiment of the present invention will be explained. Note that, FIG. 8B shows the change of the wall surface temperature TS of the auxiliary chamber 51 and the change of the reduction coefficient RC after engine cold startup. As shown in FIG. 8B, the wall surface temperature TS of the auxiliary chamber 51 at the time of engine cold startup is lower than the fuel-deposited wall surface temperature TSX. Therefore, as will be understood from FIG. 8A, at this time, the reduction coefficient RC is made lower than 1.0. That is, at this time, the injection ratio of the fuel injection amount from the auxiliary fuel injector 53 to the fuel injection amount from the main fuel injector 3 is made to decrease.

Next, if the warmup operation of the engine is started and the wall surface temperature TS of the auxiliary chamber 51 rises, along with this, the reduction coefficient RC also rises, that is, the injection ratio of the fuel injection amount from the auxiliary fuel injector 53 to the fuel injection amount from the main fuel injector 3 rises. Next, if the Δt time elapses after engine startup, the wall surface temperature TS of the auxiliary chamber 51 reaches the fuel-deposited wall surface temperature TSX. At this time, the reduction coefficient RC is made 1.0 while the injection ratio of the fuel injection amount from the auxiliary fuel injector 53 to the fuel injection amount from the main fuel injector 3 is made a predetermined constant value. Next, after a while, the engine warmup operation ends and the operation of the engine is shifted to normal operation. At this time, the wall surface temperature TS of the auxiliary chamber 51 rises to 200° C. or more. Note that, in the period after engine startup to the elapse of Δt time, the wall surface temperature TS of the auxiliary chamber 51 becomes a lower temperature than the wall surface temperature TS of the auxiliary chamber 51 at the time of completion of warmup. Therefore, this period is called the "wall surface lower temperature period Δt".

Therefore, in the embodiment of the present invention, the internal combustion engine comprises the main combustion chamber 2, the main fuel injector 3 for feeding fuel to the main combustion chamber 2, the auxiliary chamber 51 formed on the top surface of the main combustion chamber 2 and communicating through the communicating holes 52 with the inside of the main combustion chamber 2, the auxiliary fuel injector 53 arranged in the auxiliary chamber 51, and the electronic control unit 20. The air-fuel mixture in the main combustion chamber 2 is burned by the jet flames J ejected from the communicating holes 52 when liquid fuel injected into the auxiliary chamber 51 is made to burn. The electronic control unit 20 is configured to control the injection ratio of the injection amount of liquid fuel from the auxiliary fuel injector 53 to the injection amount of fuel from the main fuel injector 3 in accordance with the wall surface lower temperature period Δt where the wall surface temperature of the auxiliary chamber 51 is a lower temperature than the wall surface temperature of the auxiliary chamber 51 at the time of completion of warmup. Furthermore, the electronic control unit is configured to decrease the injection ratio as compared with after completion of warmup during a time from when the engine is started and to when the wall surface lower temperature period Δt has elapsed.

In this regard, in the embodiment of the present invention, as shown in FIG. 8B, when the wall surface temperature TS of the auxiliary chamber 51 is lower than the fuel-deposited wall surface temperature TSX, the injection ratio of the fuel injection amount from the auxiliary fuel injector 53 to the fuel injection amount from the main fuel injector 3 is made to decrease. In this case, as explained above, the fuel-deposited wall surface temperature TSX shows the wall surface temperature where the liquid fuel injected inside of the auxiliary chamber 51 starts to deposit on the inside wall surface of the auxiliary chamber 51 when the wall surface temperature TS of the auxiliary chamber 51 is made to fall. Therefore, this fuel-deposited wall surface temperature TSX, stated another way, can be said to show the temperature at which liquid fuel injected from the auxiliary fuel injector 53 no longer deposits on the inside wall surface of the auxiliary chamber when making the wall surface temperature TS of the auxiliary chamber 51 rise.

Now then, in the embodiment of the present invention, as explained above, the injection ratio of the fuel injection amount from the auxiliary fuel injector 53 to the fuel injection amount from the main fuel injector 3 is made to decrease compared with after completion of warmup during a time from when the engine is started and to when the wall surface lower temperature period Δt where the wall surface temperature of the auxiliary chamber 51 is a lower temperature than the wall surface temperature of the auxiliary chamber 51 at the time of completion of warmup has elapsed. In this case, in one embodiment of the present invention, when the wall surface temperature TS of the auxiliary chamber 51 rises to a temperature where liquid fuel injected from the auxiliary fuel injector 53 will no longer deposit on the wall surface inside the auxiliary chamber, it is deemed that the wall surface lower temperature period Δt has elapsed. Therefore, in this case, the injection ratio of the fuel injection amount from the auxiliary fuel injector 53 to the fuel injection amount from the main fuel injector 3 is made to decrease compared with after completion of warmup during a time until the wall surface temperature TS of the auxiliary chamber 51 rises to a temperature where liquid fuel injected from the auxiliary fuel injector 53 no longer deposits on the inside wall surface of the auxiliary chamber.

Figure 9A:
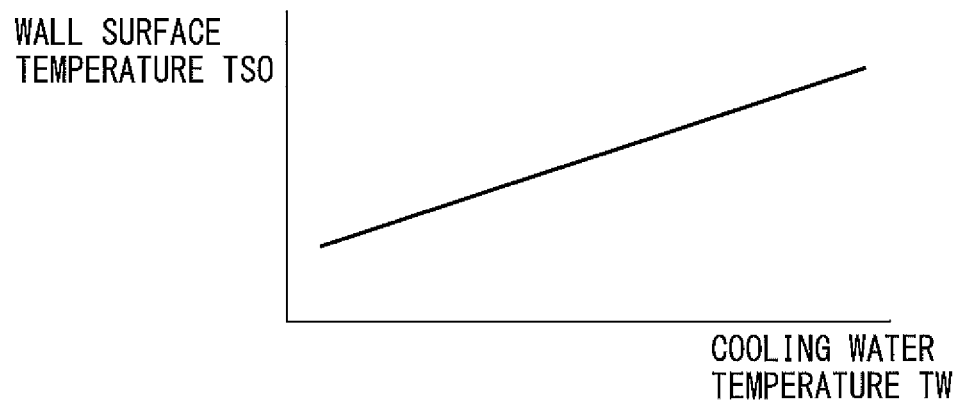
FIG. 9A and FIG. 9B respectively are view showing a wall surface temperature TSO of an auxiliary chamber and a correction coefficient KC.
Figure 9B:
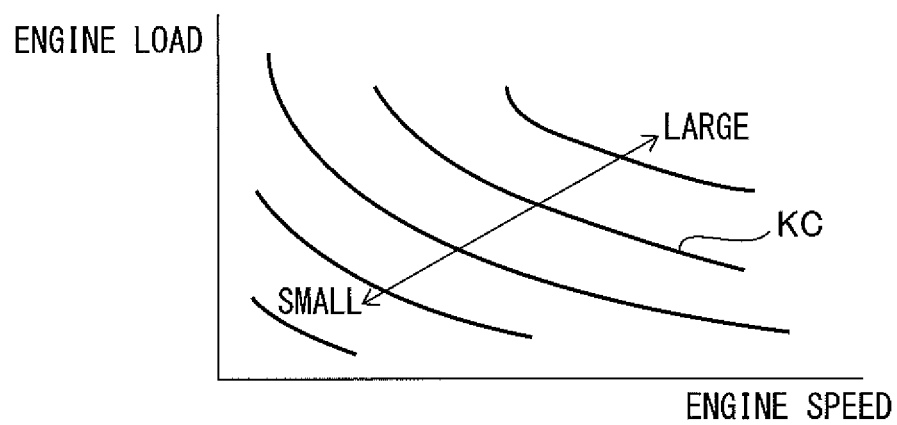

In this case, the wall surface temperature TS of the auxiliary chamber 51 can be found by actual measurement. Further, the temperature TS inside the auxiliary chamber 51 can also be estimated from the operating state of the engine. FIG. 9A and FIG. 9B show one example of the case of estimating the temperature TS inside the auxiliary chamber 51 from the operating state of the engine. That is, a water jacket is formed inside the cylinder head 42 around the auxiliary chamber casing 50. Therefore, the wall surface temperature TS inside the auxiliary chamber 51 is strongly affected by the temperature of the engine cooling water. Furthermore, the wall surface temperature TS inside the auxiliary chamber 51 is also affected by the engine speed and the engine load. In FIG. 9A, the change of the wall surface temperature TS inside the auxiliary chamber 51 when the engine cooling water temperature TW changes in the state maintaining the engine speed and the engine load constant is shown by the wall surface temperature TSO inside the auxiliary chamber 51.

On the other hand, in FIG. 9B, the correction coefficient KC for the wall surface temperature TSO inside the auxiliary chamber 51 (wall surface temperature TS inside auxiliary chamber 51=wall surface temperature TSO inside auxiliary chamber 51·correction coefficient KC) is shown in the form of a function of the engine speed and the engine load. That is, the higher the engine speed and the higher the engine load, the higher the amount of heat generated per unit time in the cylinder. Therefore, the higher the engine speed and the higher the engine load, the higher the wall surface temperature TS inside the auxiliary chamber 51. Therefore, as shown in FIG. 9B, the higher the engine speed and the higher the engine load, the larger the correction coefficient KC is made.

In this way, in the example shown in FIG. 9A and FIG. 9B, the wall surface temperature TS inside the auxiliary chamber 51 is estimated from the engine cooling water temperature TW, the engine speed, and the engine load. That is, in this example, the wall surface temperature TS inside the auxiliary chamber 51 is estimated from the operating state of the engine. In this case, until the estimated wall surface temperature TS inside the auxiliary chamber 51 rises to a temperature where liquid fuel injected from the auxiliary fuel injector 53 no longer deposits on the inside wall surface of the auxiliary chamber, the injection ratio of the fuel injection amount from the auxiliary fuel injector 53 to the fuel injection amount from the main fuel injector 3 is made to decrease.

Figure 10:
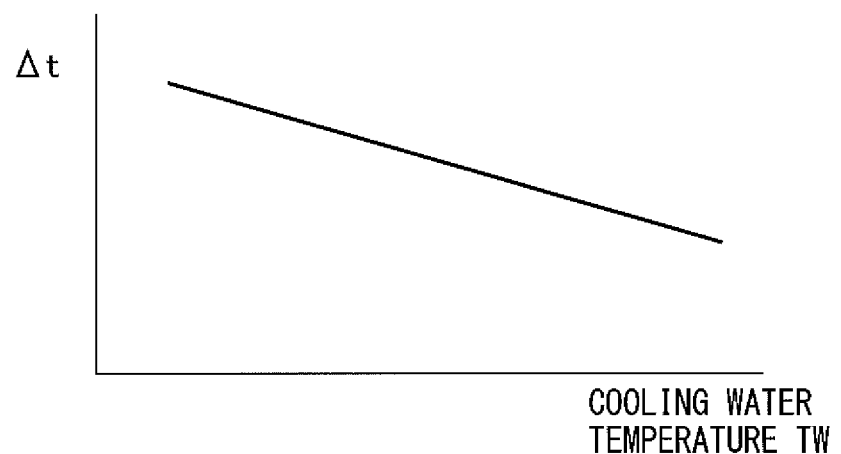
FIG. 10 is a view showing a wall surface lower temperature period $\Delta t$.

On the other hand, it may be possible to find the wall surface lower temperature period Δt shown in FIG. 8B in advance by experiments and store it and perform the decreasing control of the injection ratio of the fuel injection amount from the auxiliary fuel injector 53 to the fuel injection amount from the main fuel injector 3 based on this stored wall surface lower temperature period Δt. In this case, after engine startup and until the elapse of the wall surface lower temperature period Δt, the injection ratio of the fuel injection amount from the auxiliary fuel injector 53 to the fuel injection amount from the main fuel injector 3 is made to decrease compared with after completion of warmup. Further, in this case, as shown in FIG. 10, the higher the engine cooling water temperature TW at the time of engine startup, the shorter the wall surface lower temperature period Δt can be made.

Figure 11:
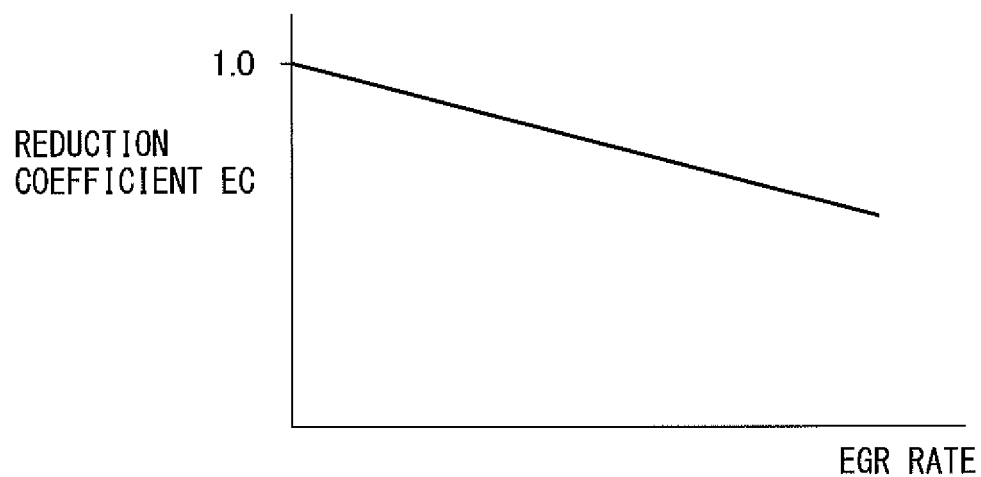
FIG. 11 is a view showing a relationship with a reduction coefficient RC and EGR rate.

On the other hand, in the embodiment of the present invention, as shown in FIG. 1, EGR gas is recirculated to the inside of the surge tank 4 through the EGR passage 15. In this case, if the EGR rate becomes high, the ratio of the specific heat of the intake gas supplied to the inside of the cylinder becomes greater and as a result the compression temperature of the intake gas in the cylinder falls. Therefore, if the EGR rate becomes higher, the evaporative action of the liquid fuel injected from the auxiliary fuel injector 53 is suppressed and liquid fuel injected from the auxiliary fuel injector 53 more easily deposits on the inside wall surface of the auxiliary chamber 51. Therefore, in one embodiment of the present invention, the more the EGR rate increases, the more the injection ratio of the fuel injection amount from the auxiliary fuel injector 53 to the fuel injection amount from the main fuel injector 3 is made to decrease. That is, in this embodiment, a reduction coefficient EC is introduced for the auxiliary injection amount Qa shown in FIG. 7 (actual auxiliary injection amount=auxiliary injection amount Qa·reduction coefficient EC). This reduction coefficient EC is used to adjust the amount of liquid fuel injected from the auxiliary fuel injector 53. This reduction coefficient EC, as shown in FIG. 11, is made to fall the higher the EGR rate.

Figure 12:
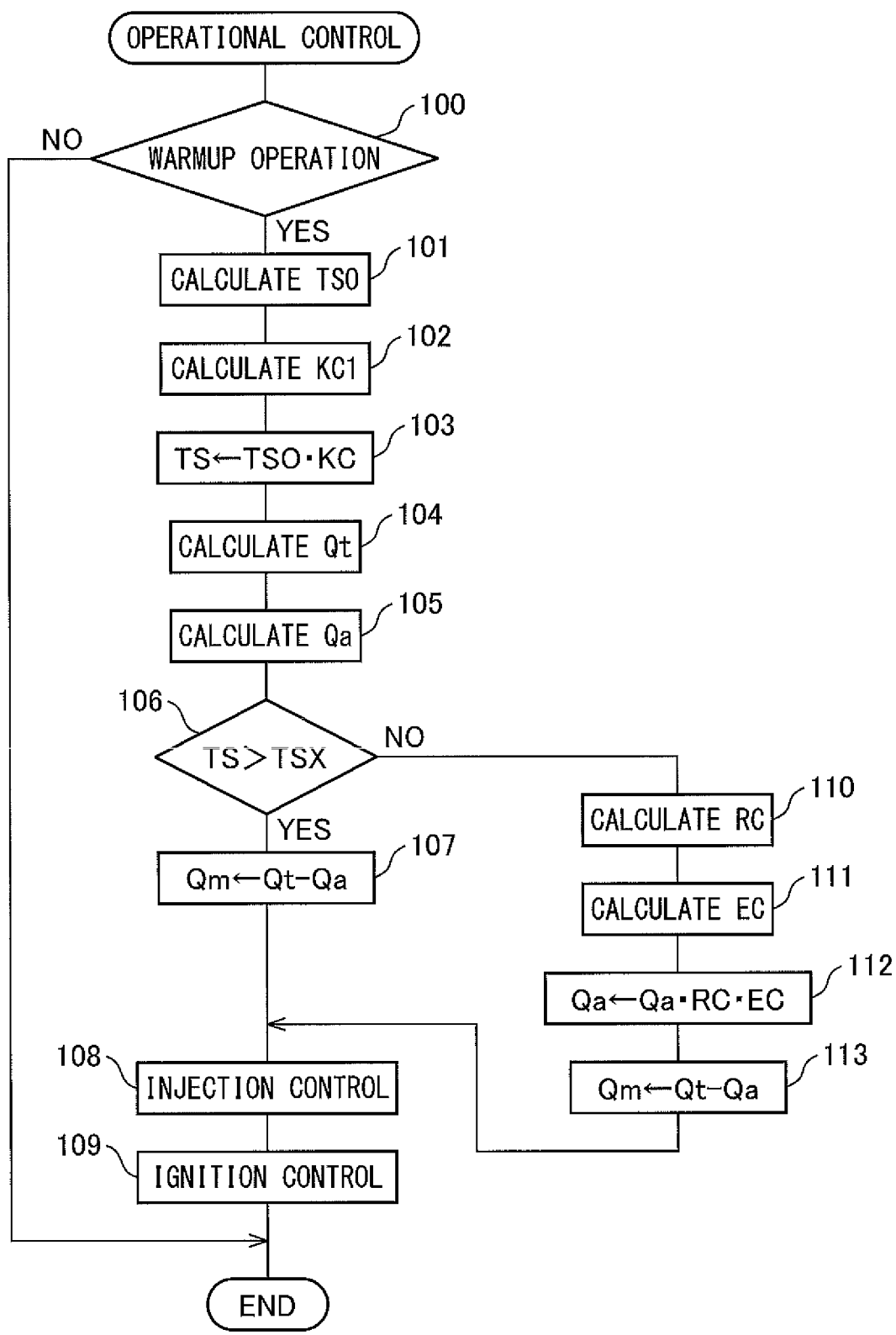
FIG. 12 is a flow chart for operational control of an engine.

Next, using as an example the case of estimating the wall surface temperature TS inside the auxiliary chamber 51 from the operating state of the engine and adjusting the injection ratio of the fuel injection amount from the auxiliary fuel injector 53 to the fuel injection amount from the main fuel injector 3 in accordance with the EGR rate, an example of operational control of the engine will be explained. FIG. 12 shows a routine for performing this operational control of the engine. This routine is performed by interruption every fixed time period.

Referring to FIG. 12, first, at step 100, it is judged if a warmup operation is currently being performed. When a warmup operation is not being currently performed, the processing cycle is ended. As opposed to this, when a warmup operation is being currently performed, the routine proceeds to step 101 where the wall surface temperature TSO inside the auxiliary chamber 51 is calculated from the engine coolant water temperature TW detected by the water temperature sensor 33 using the relationship shown in FIG. 9A. Next, at step 102, the correction coefficient KC is calculated from the engine speed and the engine load using the relationship shown in FIG. 9B. Next, at step 103, the wall surface temperature TS inside the auxiliary chamber 51 (=wall surface temperature TSO inside auxiliary chamber 51·correction coefficient KC) is calculated.

Next, at step 104, the demanded injection amount Qt is calculated from the amount of depression of the accelerator pedal 30 and the engine speed. Next, at step 105, the auxiliary injection amount Qa is calculated from the demanded injection amount Qt. Next, at step 106, it is judged if the wall surface temperature TS inside the auxiliary chamber 51 is higher than the fuel-deposited wall surface temperature TSX. When it is judged that the wall surface temperature TS inside the auxiliary chamber 51 is higher than the fuel-deposited wall surface temperature TSX, the routine proceeds to step 107 where the auxiliary injection amount Qa calculated at step 105 is subtracted from the demanded injection amount Qt calculated at step 104 whereby the main injection amount Qm is calculated. Next, at step 108, main fuel is injected from the main fuel injector 3 by the calculated main injection amount Qm, while auxiliary fuel is injected from the auxiliary fuel injector 53 by the calculated auxiliary injection amount Qa. Next, at step 109, control of ignition by the spark plug 54 is performed.

On the other hand, when at step 106 it is judged that the wall surface temperature TS inside the auxiliary chamber 51 is not higher than the fuel-deposited wall surface temperature TSX, the routine proceeds to step 110 where the reduction coefficient RC is calculated from the wall surface temperature TS inside the auxiliary chamber 51 using the relationship shown in FIG. 8A. Next, at step 111, the reduction coefficient EC is calculated from the current EGR rate using the relationship shown in FIG. 11. Next, at step 112, the auxiliary injection amount Qa calculated at step 105 is multiplied with the reduction coefficient RC calculated at step 110 and the reduction coefficient EC calculated at step 112 whereby the final auxiliary injection amount Qa is calculated.

Next, at step 113, the final auxiliary injection amount Qa calculated at step 112 is subtracted from the demanded injection amount Qt calculated at step 104 whereby the main injection amount Qm is calculated. Next, at step 108, main fuel is injected from the main fuel injector 3 by the main injection amount Qm calculated at step 113, while auxiliary fuel is injected from the auxiliary fuel injector 53 by the auxiliary injection amount Qa calculated at step 112. Next, at step 109, control of ignition by the spark plug 54 is performed.

The invention claimed is:

1. An internal combustion engine comprising:
a main combustion chamber that communicates with an air intake port,
a main fuel injector for feeding fuel to the main combustion chamber,
an auxiliary chamber formed on a top surface of the main combustion chamber and communicating through communicating holes with an inside of the main combustion chamber,
an auxiliary fuel injector arranged in the auxiliary chamber, an air-fuel mixture in the main combustion chamber being burned by jet flames ejected from the communicating holes when liquid fuel injected into the auxiliary chamber is made to burn by an igniter, and
an electronic control unit configured to control an injection ratio of (i) an injection amount of the liquid fuel injected from the auxiliary fuel injector to (ii) an injection amount of the fuel injected from the main fuel injector, the injection ratio being controlled based on a wall surface lower temperature period which is a period during which a wall surface temperature of the auxiliary chamber is lower than the wall surface temperature of the auxiliary chamber at a time of completion of engine warmup, wherein
the electronic control unit is further configured to cause the injection ratio during a first time period to be lower than the injection ratio during a second time period, the first time period extending from a time at which the engine is started to a time at which the wall surface lower temperature period has elapsed, the second time period occurring after the completion of the engine warmup.

2. The internal combustion engine according to claim 1, wherein the electronic control unit determines that the wall surface lower temperature period has elapsed by determining that the wall surface temperature of the auxiliary chamber has risen to a temperature at which the liquid fuel injected from the auxiliary fuel injector will no longer deposit on an inside wall surface of the auxiliary chamber.

3. The internal combustion engine according to claim 2, wherein the wall surface temperature of the auxiliary chamber is estimated from an operating state of the engine.

4. The internal combustion engine according to claim 1, wherein the wall surface lower temperature period is stored in advance in a memory.

5. The internal combustion engine according to claim 1, wherein the electronic control unit increases an amount by Which the injection ratio is made to decrease in the first time period as an EGR rate increases.

* * * * *